June 28, 1932.　　G. OLDHAM　　1,865,038
BEARING FOR FELTING ROLLS
Filed Aug. 26, 1929　　2 Sheets-Sheet 1

INVENTOR
George Oldham
BY
ATTORNEYS

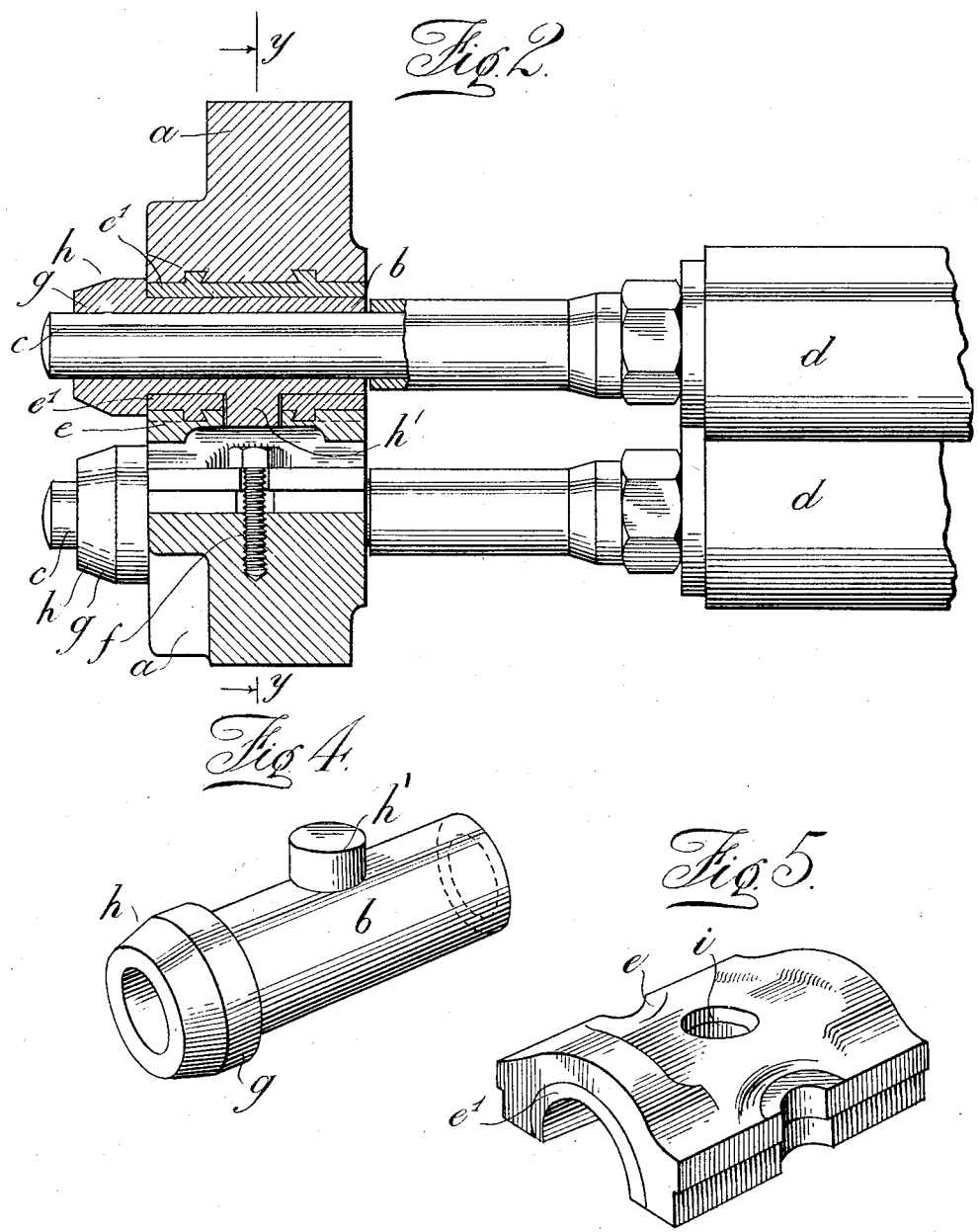

Patented June 28, 1932

1,865,038

UNITED STATES PATENT OFFICE

GEORGE OLDHAM, OF DENTON, NEAR MANCHESTER, ENGLAND

BEARING FOR FELTING ROLLS

Application filed August 26, 1929, Serial No. 388,565, and in Great Britain December 4, 1928.

This invention relates to planking or felting machinery for use in the manufacture of fur and wool hat bodies.

The chief object of the present invention is to provide machinery of the class above described whereby, in practice, the bearings which go to form parts of the same are of improved construction and arrangement, can be changed or removed at frequent intervals, and this more readily, cheaply and expeditiously than heretofore, and are made of such material and form that they bear upon the shafting, more particularly of the rollers of the machine, more evenly than is at present the case and keep such shafting in true alignment at all times.

According to this invention, the machine is provided with preferably a plurality of shaft bearings, more particularly for the shafting of the rollers of the machine, each of the said bearings comprising a detachable bush, sleeve or the like adapted to be prevented from rotating relative to a housing therefor by means of a detachable cap associated with the said housing, the said bush, sleeve or the like having a lug or projection or more than one lug or projection adapted to co-operate with an opening or hole or more than one opening or hole in the detachable cap, or vice versa.

In order that the said invention may be clearly understood and readily carried into effect the same will now be described more fully, by way of example, with reference to the accompanying drawings, in which:—

Figure 1:
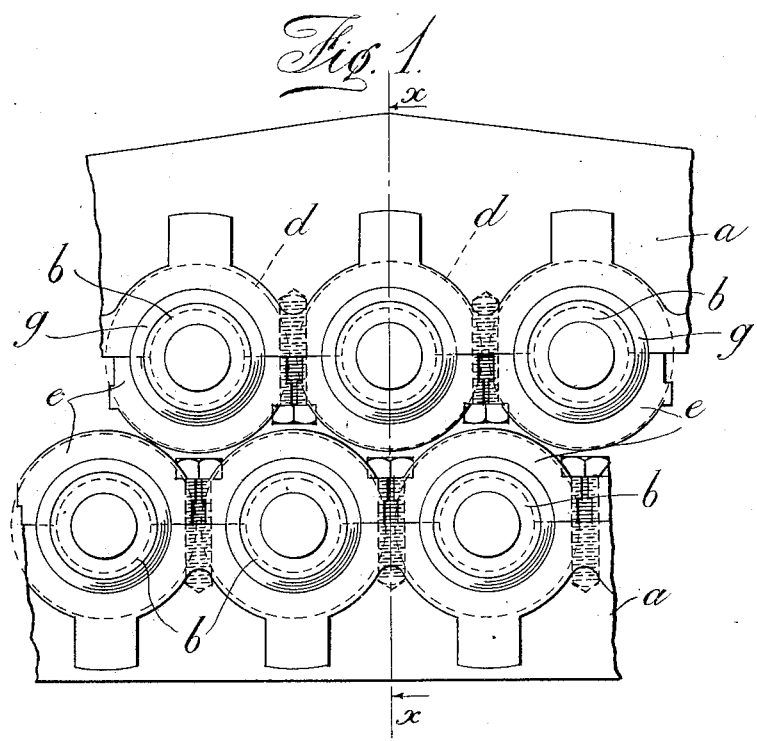
Figure 3:
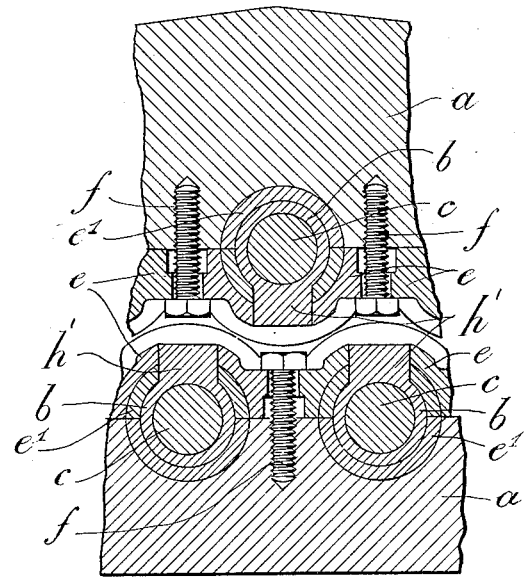

Figure 1 is a fragmentary end elevation of a planking or felting machine embodying the invention, Figure 2 is a fragmentary longitudinal sectional view taken on the line $x$—$x$ of Figure 1, Figure 3 is a fragmentary transverse sectional view taken on the line $y$—$y$ of Figure 2, Figure 4 is a perspective view on an enlarged scale, showing one of the bearing bushes detached, and Figure 5 is a perspective view, also on an enlarged scale showing one of the bearing caps detached.

Referring to the drawings, the machine comprises a frame having members $a$ at the sides thereof, a portion only of one of the sides being shown, adapted to afford housings for bearings constituted, for example, by bushes $b$ adapted to support the ends of the rotatable shaft $c$ associated with the rollers $d$ of the machine. Any desired number of rollers may be employed, the said rollers being arranged in any suitable manner, according to requirements. The machine may, for example, be the usual standard machine with thirteen or nineteen rollers, each of the shafts of which would engage at each of the ends thereof, with a bush $b$. Each bush is detachably mounted within its respective housing by means of a detachable cap $e$, the caps being secured in position by means of screws $f$ secured to the side members of the frame. The housings and the caps associated therewith are preferably provided with linings $e'$ of anti-friction metal or gun-metal, although any other suitable material or materials may be employed, such linings surrounding, and engaging with the bushes $b$, which may each be enlarged or formed with a head or flange $g$ bearing at the inner end thereof against the side of the machine frame, the said head or flange being shown tapered at $h$ in an outward direction. The bushes $b$ are also preferably made of anti-friction, or gun metal, but may be made of any other suitable material or materials.

Each of the bearings or bushes $b$ is of cylindrical formation and formed or provided with a lug or projection $h'$ which engages within an opening or hole $i$ in the corresponding cap $e$, see more particularly Figures 4 and 5, the said lug or projection being shown as of circular formation and the opening in the cap being made to accord therewith, the arrangement being such as to prevent rotation of the bearing or bush relatively to the housing therefor and to the lining associated therewith. It will be understood that, alternatively, the said lug or projection $h'$ may be formed or provided on the said cap, the hole or opening $i$ being in the bush $g$. Further, more than one lug or projection and corresponding opening may be provided, whilst the formation thereof may be other than circular.

An advantage gained by the present invention is that the lining $e'$ is maintained intact and free from wear by the bearing bush $b$ owing to the latter not revolving in the lining.

With the improved bearing, when a shaft has to be removed or changed the corresponding cap $e$ is first detached and then the bush $b$ is slipped off the shaft and applied to the new shaft. Any wear that has taken place between the shaft and the bush $g$ can then be detected and rectified, and the adjustment, thereby made accurate. Again, a considerable reduction in the cost of fitting bearings and linings to machinery of the type above described is obtained by the adoption of the improved constructional form of bearing. Further, the bearing enclosed in the lining, when such bearing and lining are made of anti-friction material or of gun metal, tends to keep the bearing in perfect alignment with the shaft and thus maintains the expense of relining down to a minimum.

A further advantage gained by the use of machinery embodying the invention, is that the hat material passing through the same is subject to a gentle kneading action during its passage, the effect of which is to facilitate the process, increase the output and to give a better "feel" or surface to the article being formed.

What I claim is:

In a felting machine a supporting frame work, a plurality of bearing boxes mounted thereon in side by side relation, bearing box cap members for said boxes, each of said cap members having an aperture therein substantially centrally thereof, said cap members being formed with a recess in each edge thereof intermediate the ends and a common securing means for fastening the adjacent sides of each pair of caps in position on the frame work, cylindrical one piece bearing members positioned within the boxes for longitudinal displacement and adapted to receive the felting rolls of the felting machine, said bearing members being provided with cylindrical lugs intermediate the ends thereof adapted to be positioned in the aperture in the bearing caps to prevent rotative and longitudinal movement of the bearing within the box.

In testimony whereof I have hereunto signed my name.

GEORGE OLDHAM.